June 3, 1947.　　　　J. B. WEBB　　　　2,421,670
ROLLERWAY SKID
Filed Oct. 14, 1944　　　2 Sheets-Sheet 1
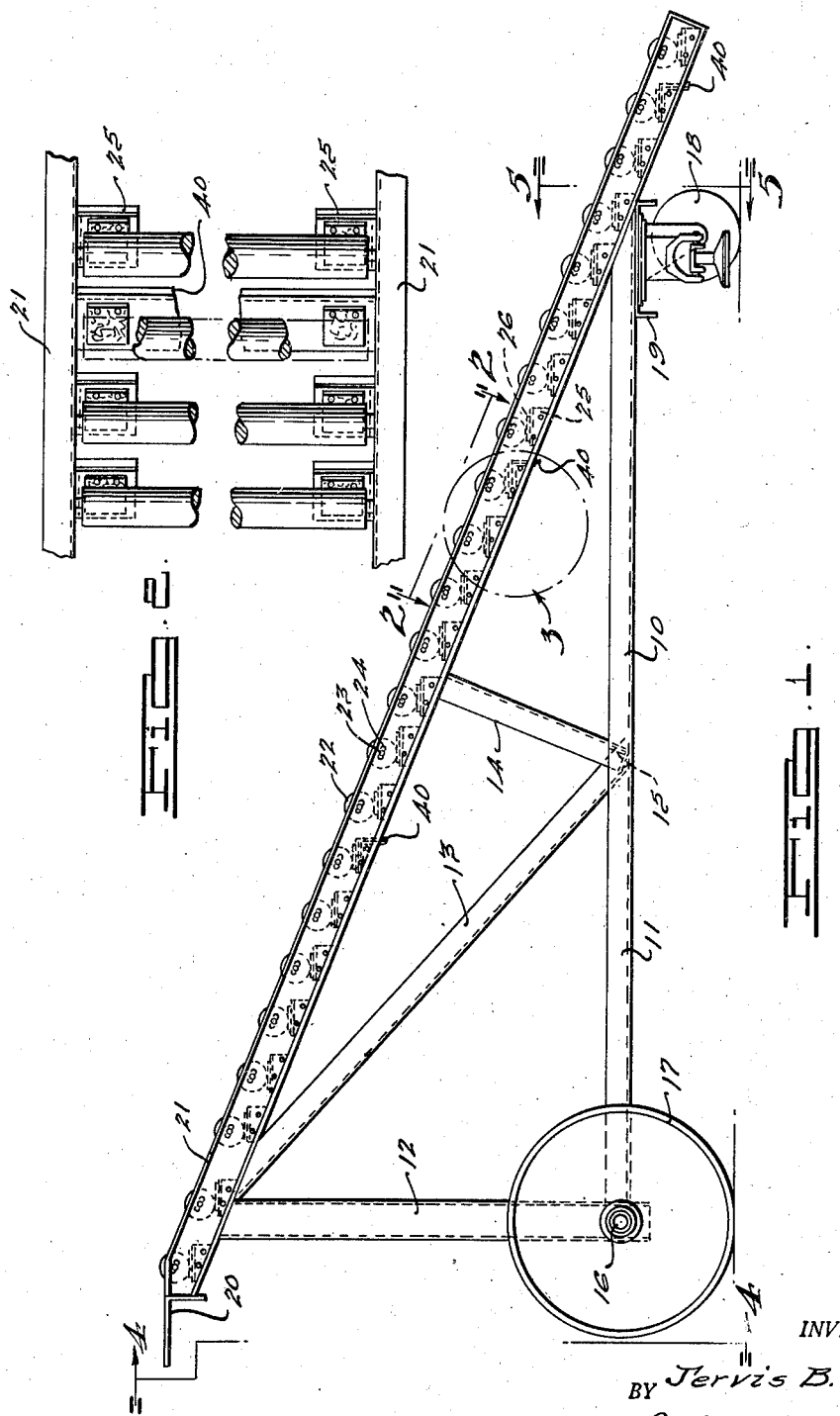
INVENTOR.
BY Jervis B. Webb.
Joseph Farley
ATTORNEY.

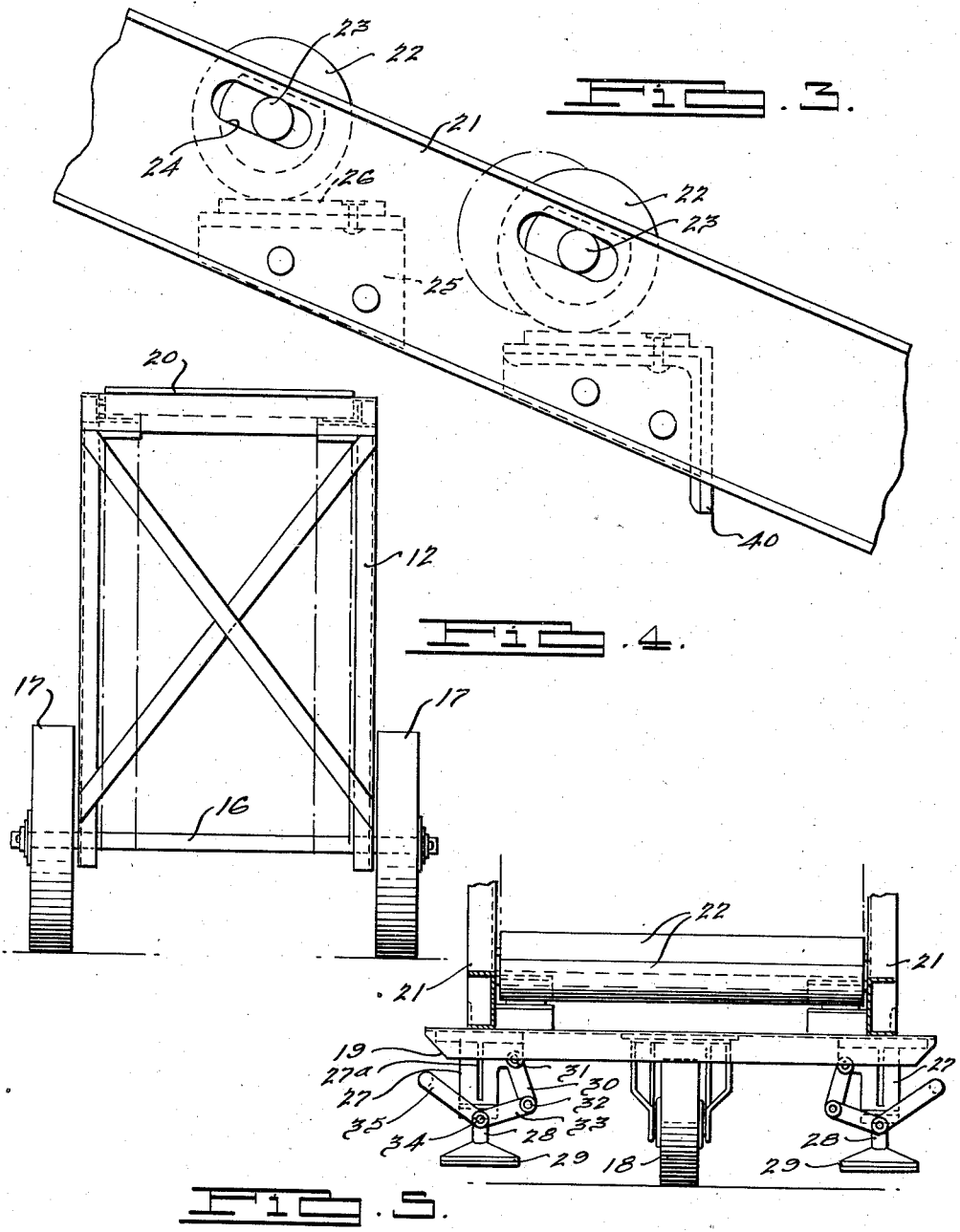

Patented June 3, 1947

2,421,670

UNITED STATES PATENT OFFICE 2,421,670

ROLLERWAY SKID

Jervis B. Webb, Bloomfield Township, Oakland County, Mich., assignor to Jervis B. Webb Company, Detroit, Mich., a corporation of Michigan Application October 14, 1944, Serial No. 558,623

3 Claims. (Cl. 193—35)

This invention relates to skids for handling materials and has for its principal object to provide a new and improved construction for handling skids by means of which the skid may be used for moving relatively heavy articles from a lower to a higher level or, vice versa, for loading or unloading purposes with a minimum of effort and danger.

The use of so-called gravity rolling skids or loading skids for handling comparatively heavy articles is rather wide-spread but said skids as heretofore constructed have been of what might be called the standard gravity roll conveyor construction wherein a plurality of cylindrical rollers having a diameter of a few inches and a length of several inches are rotatably supported in a pair of laterally spaced frame members by trunnions or gudgeons secured to the end of the roller or by through shafts which pass through the center of said rollers. If trunnions or gudgeons are employed, suitable anti-friction bearings are usually mounted in the frame members, while if through shafts are employed, which is the construction most commonly used, ball bearings in which the shafts are supported are commonly secured in the ends of the rollers. This type of construction has proven very satisfactory for transporting heavy articles either along a horizontal plane or a slightly inclined plane because, due to the use of the anti-friction bearings, very little resistance is offered by the gravity roll so that the articles may be propelled along the gravity rolls with very little effort. When, however, a gravity roll construction is used as a skid for moving heavy articles up or down a relatively sharp incline, there is always the danger that the article may get away from the handlers thereof and roll down the skid with great rapidity with a possibility not only of breakage of the article but also of injury to the handlers or other individuals.

The present invention has for its principal object to provide a new and improved construction of a gravity roll handling skid whereby the possibility of articles being handled getting away from the handlers thereof and sliding down the skid too rapidly is obviated.

A further object is to provide a new and improved construction and mounting for the gravity rollers in cooperation with braking means therefor whereby the periphery of the rollers will be automatically moved into engagement with the braking means when the article moves downwardly along the skid and so that when the article is pushed upwardly along the skid the rollers will be automatically released from engagement with the said braking means.

Another object is to mount a length of gravity rollers in a suitably inclined position for use as a handling skid upon a readily dirigible wheeled frame and provided with means for locking the frame against movement when the skid is being used for loading or unloading purposes.

The above and other objects of the present invention will appear more fully from the following more detailed description and by reference to the accompanying drawings forming a part hereof and wherein:

Fig. 1 is a side elevation of a handling skid constructed in accordance with the principles of the present invention;

Fig. 2 is a fragmentary plan view of the structure taken on the line 2—2 of Fig. 1;

Fig. 3 is an enlarged side elevation showing a portion of the skid such as contained within the circle indicated at 3 in Fig. 1;

Fig. 4 is a view of the skid as seen from the line 4—4 of Fig. 1; and

Fig. 5 is an enlarged section taken on the line 5—5 of Fig. 1.

As shown in Fig. 1, the skid comprises a frame 10 preferably constructed of structural iron members suitably connected together, preferably by welding. The supporting frame consists of lower longitudinally extending members 11 to which are suitably secured at one end thereof the upright pieces 12, the members 11 preferably being of angle iron shape while the members 12 are of channel shape. Suitable strut braces, such as indicated by the members 13 and 14, are also secured to the member 10 and likewise a crossbrace, such as indicated by the numeral 15, is provided to which the lower ends of the strut braces 13 and 14 are secured.

At one end of the skid an axle 16 is provided which passes through the lower ends of the upright channel pieces 12, wheels 17 being rotatably mounted upon the shaft 16. At the other end of the frame opposite the wheels 17 a caster wheel 18 is suitably secured to the bottom of a channel iron 19.

Supported at one end by the upright 12 and braced by a transverse angle plate 20 is a pair of inclined channel iron members 21, the lower ends of which are supported by the channel member 19. The inclined channel members 21 carry a plurality of gravity rolls 22 having shafts 23 projecting from the ends thereof. The shafts 23 extend into elongated slots 24 formed in the channel pieces 21. Each of the channel members 21 is provided immediately below the elongated slots 24 thereof with short angle iron pieces 25, 40 which have secured on the upper horizontal face thereof pads 26, preferably of brake-band lining material, with which the periphery of the rollers 22 are adapted to engage. The channel iron roller supports 21 are connected at spaced intervals by angle iron cross-braces 40 which serve to hold the roller supports in properly spaced relationship.

Carried by the channel member 19 adjacent to each end thereof is a pair of brackets 27 each provided with a central vertical bore in which is received the shaft 28 of a locking dog 29. A toggle link 30 has its upper end pivotally secured, as at 31, to each bracket 27 and its lower end pivotally secured at 32 to a bell crank lever 33 pivoted, as at 34, to the shaft 28 of the locking dog; the bell crank lever 33 having an arm 35 which projects outwardly in position such that it may be readily pressed downwardly to force the locking dog in engagement with the ground to lock the toggle links 30, 33 and the dog 29 against movement.

The manner in which the device operates will be readily understood. The loading skid may be readily wheeled to a place where any loading or unloading operations are to be performed. When the skid has been properly positioned, the projecting ends 35 of the bell crank levers 33 are pressed downwardly to force the locking dogs 29 in contact with the ground, the pivotal point 32 passing beyond a line connecting the pivots 31 and 34 and abutting against a flange or web 27—a which projects laterally from bracket 27, thereby to hold the dog 29 in its lowermost locked position and lock the skid against accidental movement.

If a heavy article is to be moved upwardly along the skid to raise the same, for example, from a loading platform onto a railway car or truck and if the article is placed upon the rollers 22 and is pushed upwardly, the upward movement of the article along the rollers will cause the ends of the shaft 23 of each roller with which the article is in contact to move upwardly in the elongated slots 24, thereby causing the periphery of the roller to move out of contacting engagement with the brake pads 26. If at any instant the upward pressure exerted by the handlers to push the article upwardly along the skid is released, the article will tend to slide back downwardly. A very slight downward movement of the article, however, will cause the rollers 22 with which the article is in contact to move downwardly in the elongated slots 24 until the peripheries of such rollers engage with the braking pads 26, thereby effectually preventing rotation of the rollers and holding the article stationary upon the skid. A very slight downward pressure, however, upon the article will cause it either to slide readily over the rollers while the rollers remain stationary or will permit the rollers to rotate slowly under the braking effect of the pads 26.

It will be seen from the foregoing that very heavy articles may be readily moved upwardly along the inclined skid by pushing the same upwardly, thus causing the rollers 22 to be released from the braking effect of the braking pads 26. When the skid is used for unloading purposes, the automatic action of the rollers engaging with the braking pads 26 prevents the article from rolling down the skid too rapidly, while at the same time permitting it to be pushed downwardly under complete control of the handlers.

Due to the fact that the axes of the elongated slots are parallel to the inclined load bearing surface of the rollers, movement of the rollers from braking position to freely rolling position will be accomplished with the load carrying surface of the rollers remaining in the same plane at all times. If, upon release of the load one or more rollers should for any reason fail to return to braking position, the other rollers would nevertheless be effective in preventing the load from sliding backwards down the plane.

It has been found that by the use of skids constructed in accordance with the principles of the present invention, heavy articles, usually as much as one thousand pounds, can be readily moved from a lower to a higher level with the use of but two handlers and that likewise they may be moved from a higher to a lower level with equal facility and safety.

While I have shown a constructional example which has proven highly satisfactory in actual use, it will be understood that changes in the specific mechanical constructional details thereof may be resorted to without departing from the spirit of my invention as set forth in the claims hereunto appended.

I claim:

1. A loading skid comprising a wheeled supporting frame, a pair of laterally spaced inclined roller supports, each having a plurality of spaced inclined elongated slots therein, the major axes of said slots being substantially parallel to the inclined plane of the load bearing portion of the skid, a plurality of rollers mounted between said roller supports and having journals rotatably received within said elongated slots, and braking means for each of said rollers consisting of a pair of angle brackets secured one to each of said roller supports below the elongated slot therein for said roller, each of said brackets having a substantially horizontally extending web located below the inclined elongated slot in which the journal of its respective roller is mounted, and a pad of brake lining material secured to the horizontal web of said bracket for engagement by the periphery of said roller when the journals of said roller move towards the lowermost ends of elongated slots in which said journals are mounted.

2. A loading skid comprising a wheeled supporting frame, a pair of laterally spaced inclined roller supports, each having a plurality of spaced inclined elongated slots therein, the major axes of said slots being substantially parallel to the inclined plane of the load bearing portion of the skid, a plurality of rollers mounted between said roller supports and having journals rotatably received within said elongated slots, braking means located adjacent to and below said elongated slots and adapted to be engaged by the periphery of said rollers as the latter move towards the lowermost ends of said slots, and means for locking said wheeled frame against movement.

3. A loading skid comprising a pair of laterally spaced inclined roller supports, each having a plurality of spaced elongated slots therein, the major axes of said slots being substantially parallel to the inclined plane of the load bearing portion of the skid, a plurality of rollers mounted between said roller supports and having journals rotatably received within said elongated slots, braking means located adjacent to and below said elongated slots and adapted to be engaged by the periphery of said rollers as the latter move towards the lowermost ends of said slots, the periphery of said rollers being retained by said elongated slots substantially in a single load bearing plane, said rollers being permitted by said elongated slots to shift their position longitudinally in the direction of the load carrying plane.

JERVIS B. WEBB.

REFERENCES CITED

The following references are of record in the file of this patent:

UNITED STATES PATENTS

| Number | Name | Date |
|---|---|---|
| 699,021 | Scharrer | Apr. 29, 1902 |
| 1,562,680 | Bohn | Nov. 24, 1925 |
| 1,708,854 | Stahlhut | Apr. 9, 1929 |
| 2,267,605 | Drake | Dec. 23, 1941 |
| 1,563,863 | Joyner | Dec. 1, 1925 |